United States Patent [19]

Pallmann

[11] Patent Number: 5,009,586
[45] Date of Patent: Apr. 23, 1991

[54] AGGLOMERATING APPARATUS FOR THE CONTINUOUS REGRANULATION OF THERMOPLASTIC WASTES

[75] Inventor: Wilhelm Pallmann, Zweibruecken, Fed. Rep. of Germany

[73] Assignee: Pallmann Maschinenfabrik GmbH & Co. KG, Zweibruecken, Fed. Rep. of Germany

[21] Appl. No.: 448,842

[22] Filed: Dec. 12, 1989

[30] Foreign Application Priority Data

Dec. 14, 1988 [DE] Fed. Rep. of Germany ....... 3842072

[51] Int. Cl.$^5$ ............................................. B29C 47/52
[52] U.S. Cl. .................................... 425/311; 425/331; 425/382 R; 425/DIG. 230; 264/142; 264/DIG. 69
[58] Field of Search ............... 425/223, 224, 310, 331, 425/311, DIG. 230, 382 R; 264/142, DIG. 69, 37; 100/903, 905, 907

[56] References Cited

U.S. PATENT DOCUMENTS

| | | | |
|---|---|---|---|
| 2,177,132 | 10/1939 | Crabtree | 425/331 X |
| 2,295,743 | 9/1942 | Meakin | 425/DIG. 230 X |
| 2,764,952 | 10/1956 | Meakin | 425/331 X |
| 3,221,674 | 12/1965 | Lawrence et al. | 425/331 |
| 3,792,950 | 2/1974 | Cuff | 425/313 |
| 4,403,936 | 10/1983 | Heeson | 425/382 R |
| 4,436,502 | 3/1984 | Nelson et al. | 425/331 |
| 4,511,321 | 4/1985 | Howard | 425/331 |
| 4,770,625 | 9/1988 | Appelgren et al. | 425/331 |

FOREIGN PATENT DOCUMENTS

| | | | |
|---|---|---|---|
| 2614730 | 4/1985 | Fed. Rep. of Germany . | |
| 849237 | 1/1939 | France . | |
| 1066328 | 11/1952 | France . | |
| 145613 | 12/1980 | German Democratic Rep. | 100/905 |
| 8504367 | 10/1985 | PCT Int'l Appl. | 425/331 |
| 687074 | 3/1950 | United Kingdom | 425/331 |

Primary Examiner—Jay H. Woo
Assistant Examiner—Robert B. Davis
Attorney, Agent, or Firm—Foley & Lardner

[57] ABSTRACT

The agglomerator includes a disk-shaped annular chamber which is confined on its periphery by an annular perforated die, the outside of which is swept by knives. The annular chamber narrows towards its periphery, and at least one pressing blade rotates in the chamber. The blade has an active flank which forms, with the perforated inside wall of the perforated die, a revolving plasticizing chamber which narrows in the direction opposite to that of revolution. Plastics wastes in the form of chips, flakes or a fleece, resulting from precomminution, are fed axially into the annular chamber and are precompacted by the pressing blade in the revolving plasticizing chamber. The wastes are degassed and plasticized by autogenously controlled pressure and temperature conditions and are forced through the perforated die. The narrowing of the chamber toward the periphery results in increased throughput capacity without causing thermal damage to the material.

4 Claims, 2 Drawing Sheets

AGGLOMERATING APPARATUS FOR THE CONTINUOUS REGRANULATION OF THERMOPLASTIC WASTES

BACKGROUND OF THE INVENTION

The invention relates to an apparatus for the continuous regranulation of thermoplastics wastes, in particular films, fibers, filaments, cords, fabrics, carpet backings, foam materials and the like, and of mixtures of these and other organic or inorganic materials.

Apparatus of this type has been described in German Pat. Specification No. 2,614,730. Using such apparatus, it is possible to transform wastes such as polyethylene, polyvinyl chloride, polypropylene, polystyrene, polyamide and similar thermoplastics, and of mixtures of these and other organic or inorganic materials, into uniform, free-flowing and abrasion-resistant granules without thermal damage to the material, such as is required for technological further processing in extruders, pressers or injection-molding machines.

The re-utilization of valuable plastics wastes, which exist in considerable quantities, for example, in the production or processing of plastics products as rejects or cuttings, by direct processing in an extruder is possible only to a very limited extent because of their voluminous nature and poor flow property. Such plastics wastes must first be pretreated appropriately by comminution, and the plastics particles which have thereby become flake-like or fleece-like are then agglomerated into highly compacted, free-flowing and abrasion-resistant granules. The granules obtained in this way must have the same quality as the granules of new material, so that they can be proportionately admixed with the latter.

During the heat treatment required for the agglomeration, the thermoplastics must therefore not be thermally damaged, i.e., they must not be heated above their type-specific melting point since, when this is exceeded, they decompose chemically with release of gases, which are harmful in most cases and cause the wastes to become useless for technological re-utilization.

Such an agglomeration of plastics particles is effected in the agglomerator known from German Pat. Specification No. 2,614,730 in such a way that the plastics particles fed into the disk-shaped annular chamber are gripped therein by the rotating pressing blades and are drawn into the plasticizing chambers which are formed by the inside wall of the annular perforated die and the active flank of the pressing blades and revolve with the latter. In the plasticizing chambers, the voluminous mass of particles is first precompacted with simultaneous venting and then plasticized within fractions of a second by the frictional heat caused by the pressing blades. Due to the shape of the blades, the plasticizing chambers in front of the rotating blades steadily narrow, and the mass is also intensively subjected to increasing thrust forces and shear forces. However, the thermoplastics mass softened in this way can then not escape through the perforated die until the pressure exerted on them by the pressing blades is sufficient to overcome the flow resistance in the die holes. When pressed through the perforated die, the thermoplastics particles, which have become tacky due to softening, are formed into compact extrudates or filaments which are cut up immediately after their emergence from the die, by knives rotating on the outside wall thereof, into uniform lengths whereby uniform free-flowing granules are obtained.

Since the flow resistance in the passage holes of the die depends on the degree of plasticization reached, with a smaller degree occurring at lower viscosities of the thermoplastics mass at that instant, a state of equilibrium is established, due to complex feedback, between the degree of softening, the pressing force and the flow resistance. This equilibrium allows the thermoplastics mass to escape through the perforated die within a time period such that unnecessary or even damaging frictional heat does not act on the mass. Consequently, only such a proportion of the mechanical drive energy is converted into process heat and pressing force as is just required for the compact agglomeration of the plastics particles. These autogenously controlled pressure and temperature conditions accordingly ensure that the agglomeration takes place always just below the melting point of the particular type of thermoplastic, so that thermal damage to the material is precluded.

SUMMARY OF THE INVENTION

Starting from this state of the art, the invention is based on the object of not only quantitatively increasing the capacity of the agglomerator but also of improving the quality of the granules produced, without at the same time having to accept an increase in the specific energy consumption, i.e., that related to the granulated plastics mass.

According to the invention, this object is achieved when the disk-shaped annular chamber narrows towards its periphery. Due to this radial narrowing of the annular chamber, the plasticizing chambers narrow not only in the peripheral direction, as in the known agglomerator, but simultaneously also in the radial direction. As a result, in addition to the existing pressing forces, the shear forces and the frictional forces exerted by the pressing blades in the radial and peripheral directions, a processing component caused by the conical sidewall, i.e., an axially directed component, also becomes effective. This three-dimensional processing of the particle mass leads not only to a more rapid precompaction, with the entrained air being forced out simultaneously, but also accelerates the plasticization within the particle volume, which three-dimensionally decreases outwards, due to additional shear effects and frictional effects. The two effects not only increase the throughput capacity of the agglomerator, but also make the plasticization within the particle mass more uniform. Moreover, this makes it possible to reduce the width of the perforated die and, apart from a reduction in construction costs, also leads to a more uniform distribution of material and temperature across the width of the die. Hence the granules produced are of a more homogeneous nature.

BRIEF DESCRIPTION OF THE DRAWINGS

The invention is explained in more detail by reference to the illustrative examples represented in the drawings in which.

DETAILED DESCRIPTION OF THE PREFERRED EMBODIMENTS

In the housing 1 of the agglomerator, a drive shaft 2 is mounted, the shaft journal 2' of which is secured against rotation both to a rotor hub 3 and a conveyor screw 4.

Figure 1:
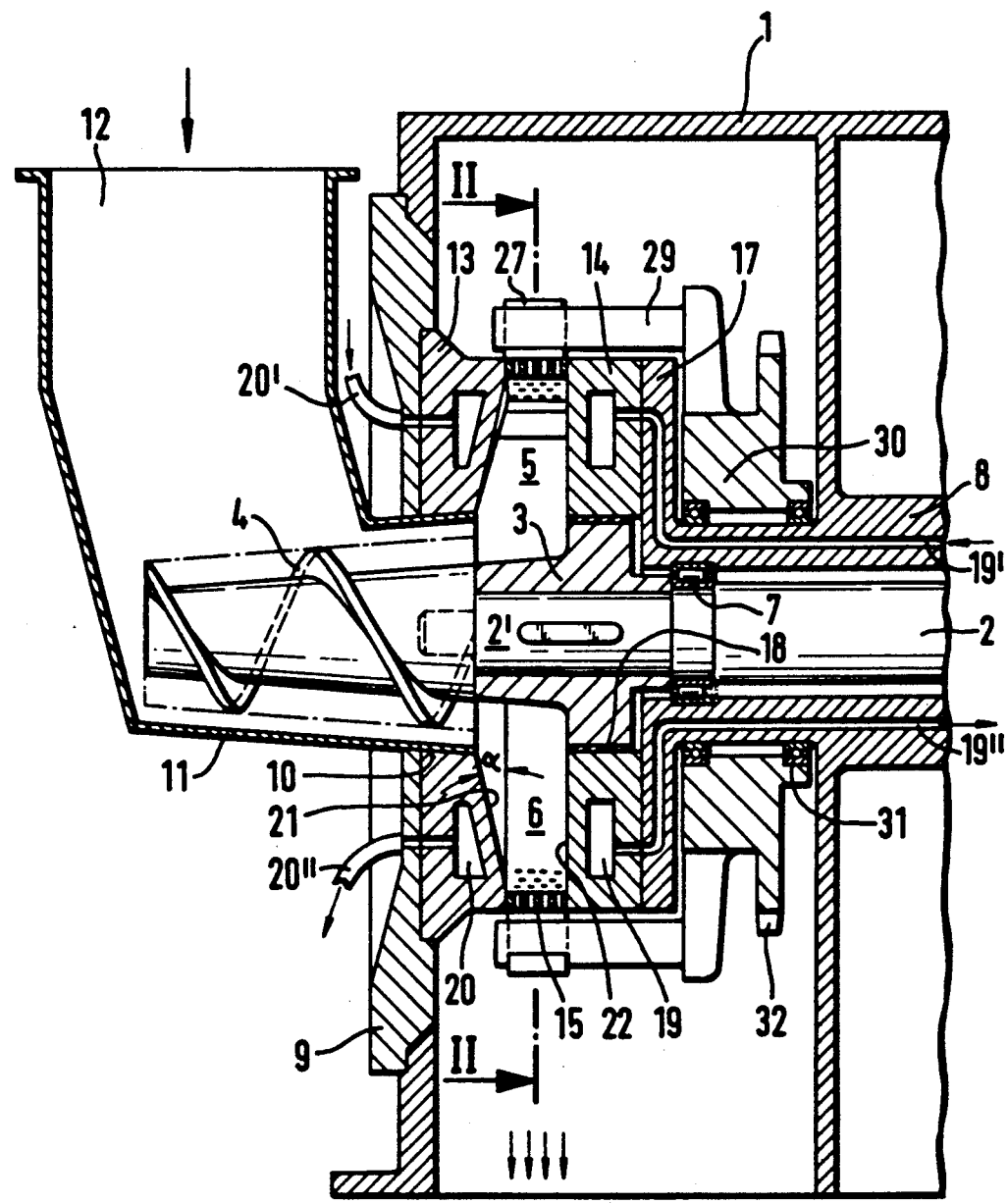
FIG. 1 is a longitudinal vertical sectional view of the agglomerator according to the invention, taken along line I—I of FIG. 2.
Figure 2:
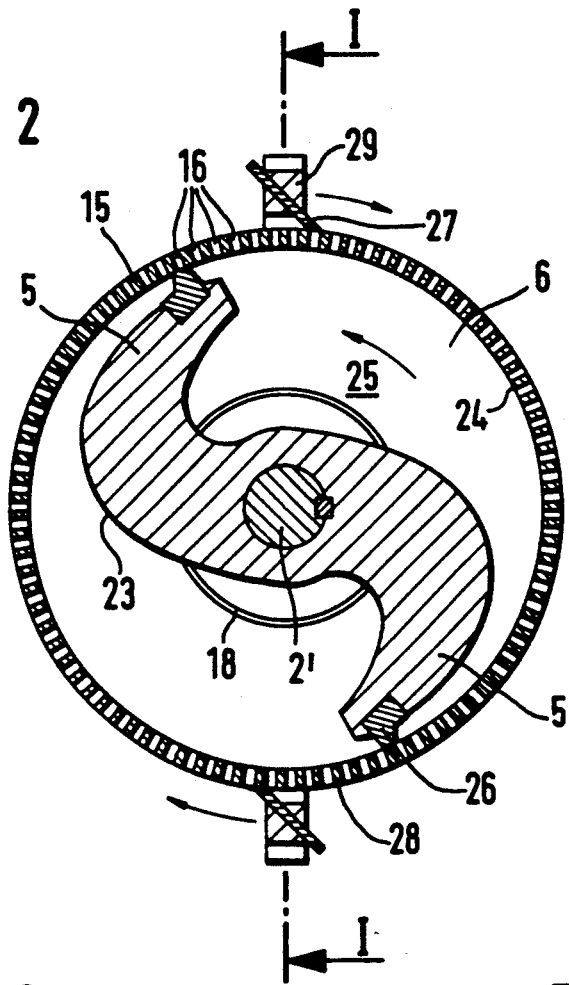
FIG. 2 is a vertical cross-sectional view of the agglomerator, taken along line II—II of FIG. 1.

On the rotor hub 3, two mutually diametrically opposite pressing blades 5 are arranged which revolve in a disk-shaped annular chamber 6 in the direction of the arrow as shown in FIG. 2. The drive shaft 2, the rotor hub 3, the conveyor screw 4 and the two pressing blades 5 form a rotational unit which is floatingly mounted in a bearing 7 which is accommodated in a tubular bushing 8 in the rear of the housing. A swing-out housing cover 9 carries, in a front bushing 10, the housing 11 of the conveyor screw 4 including a feed inlet branch 12.

The disk-shaped annular chamber 6 subjected to the action of the two pressing blades 5 is formed by two annular walls 13, 14 which are joined to one another at their periphery by an annular perforated die 15. The perforated die 15 is provided with passage holes 16 distributed around its periphery. The front annular wall 13 is joined to the housing cover 9, whereas the rear annular wall 14 is fixed to a flange 17 which is formed on the tubular bushing 8 in the rear of the housing. The rear seal of the disk-shaped annular space 6 is provided by a special gasket 18 inserted between the rotor hub 3 and the rear annular wall 14. In both annular walls 13, 14, coolant chambers 19, 20 are provided to which and from which the coolant is supplied and discharged through lines 19', 19" and 20', 20", respectively.

The inside surface 21 of the front annular wall 13 has a frustoconical shape, being inclined at an acute angle $\alpha$ to a plane perpendicular to the axis of the shaft 2. By contrast, the inside surface 22 of the rear annular wall 14 is located in a plane perpendicular to the axis of the shaft. Due to the tapered frustoconical inside surface 21 of the front annular wall 13, the disk-shaped annular chamber 6 narrows outwardly towards its periphery. Consequently, the front surface of the pressing blades 5 revolving therein are also chamfered correspondingly.

As can be seen from FIG. 2, the effective leading front surface flanks 23 of the two pressing blades 5 form, with the cylindrical inside wall 24 of the perforated die 15, two revolving plasticizing chambers 25 which narrow in the direction opposite to that of rotation of the pressing blades 5, each chamber being sealed in the peripheral direction by a thrust member 26 bearing against the inside wall 24 of the perforated die 15.

The cylindrical outside wall 28 of the perforated die 15 is swept by two revolving knives 27 which are adjustably and exchangeably fixed to knife holders 29.

The knife holders 29 are located on a knife holder hub 30 which is mounted by means of bearings 31 on the rear tubular housing bushing 8, with the hub 30 being provided with a sprocket 32 by means of which the hub can be rotated.

Figure 3:
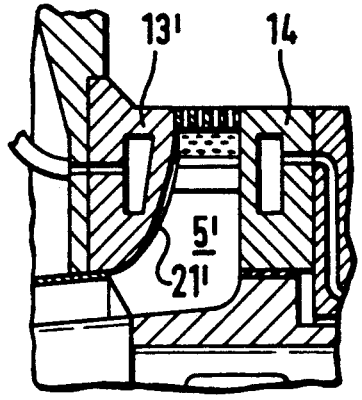
FIG. 3 is a fragmentary vertical sectional view illustrating a modified embodiment of the invention.

The modified embodiment of the invention shown in FIG. 3 has a front annular wall 13', the inside surface 21' of which is of a rotationally symmetrical convex form, the front surface of the pressing blades 5' having a correspondingly concave shape.

Figure 4:
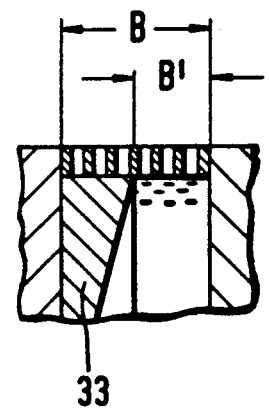
FIG. 4 is a diagrammatic illustration of a testing device confirming the technical advance achieved according to the invention.

By means of the testing device shown diagrammatically in FIG. 4, it was found in a surprising manner that, by insertion of a conical ring 33 into the agglomerator known from German Pat. Specification No. 2,614,730, whereby the original effective width B of the perforated die 15 was reduced by about half to B', the properties and homogeneity of the granules produced was markedly improved, without a significant reduction of the acceptable throughput rate.

The agglomerator designed according to the invention operates as follows. The thermoplastics wastes to be granulated and of the type mentioned at the outset are initially comminuted in, for example, cutting mills. The mass of chips, flakes or a fleece thus produced is then fed to the inlet branch 12 of the agglomerator, where it is delivered by the conveyor screw 4 to the disk-shaped annular chamber 6. In the latter, it is gripped by the effective flank 23 of the pressing blade 5 and drawn into the revolving plasticizing chambers 25. As a result of the special curvature of the effective flanks 23 of the pressing blade 5, the loose mass of particles is first precompacted with simultaneous venting and then plasticized, that is, converted into a softened state, by intensive frictional heat, within fractions of a second. As soon as the compacted mass of particles has been sufficiently plasticized and the pressure exerted by the pressing blades 5 is sufficient to overcome the flow resistance in the passage holes 16, the plasticized mass of particles can escape from the plasticizing chambers 25 through the holes 16 of perforated die 15. While being pressed through the perforated die, the mass of particles undergoes a further compaction in the passage holes, and the plastics particles, which have become tacky due to the plasticization, sinter together and are thus formed into compact extrudates or filaments. Immediately after these have emerged from the perforated die 15, they are cut up by the revolving knives 27 into uniform sections, so that uniform, homogeneous and highly compacted granules result.

Since the disk-shaped annular chamber 6 tapers radially outwards according to the invention, pressing forces, shear forces and frictional forces are exerted in the plasticizing chambers 25 on the mass of plastics particles not only in the radial and peripheral directions by the effective flank 23 of the pressing blades 5 but, due to the conical shape of the inside surface 21 of the annular wall 13, additionally also by the latter in the axial direction. This three-dimensional processing not only favors the precompaction, i.e., the expulsion of the air entrained with the loose mass of particles, but also accelerates the plasticization by intensifying the frictional heat and making it uniform within the mass of particles. This results in an increase in the specific throughput capacity, that is to say, the throughput capacity related to the free passage cross-section of the perforated die, and in a more homogeneous and more compact structure of the granules produced.

What is claimed is:

1. Agglomerating apparatus for the continuous, re-granulation of thermoplastic wastes comprising films, fibers, filaments, cords, fabrics, carpet backings, foam materials, and mixtures of these materials, the apparatus comprising:
   (a) stationary, axially spaced annular walls having radially inner and outer ends, and opposite inside surfaces
   (b) an annular die interposed between and connected to said annular walls at the radially outer ends thereof, said die containing perforations over at least part of its annular surface, said annular walls and said die defining therewithin a plasticizing chamber, (c) a feed inlet communicating with said plasticizing chamber, (d) shaft means including a rotor hub mounted in said apparatus generally centrally with respect to said plasticizing chamber, and means for rotating said shaft and hub, (e) at least one pressing blade nonrotatably mounted on said hub for rotation in said plasticizing chamber, said at least one blade having a leading flank and being constructed such that when combined with the inside surface of said die, said plasticizing chamber steadily narrows in a direction opposite to the direction of rotation of said at least one blade, (f) knife means mounted for rotation outwardly of said annular die for contacting the radial outer surface of said die and cutting agglomerated material passing through said die perforations, and wherein the spacing of said annular walls and the pressing blade at their radially outer portions is less than the spacing at their radially inner portions thereby to define a radially outward narrowing of said plasticizing chamber, such narrowing permitting throughput capacity to be increased without thermal damage to the material.

2. The apparatus as claimed in claim 1, wherein the inside surface of at least one of said two annular walls is formed as an enveloping surface of a truncated cone.

3. The apparatus as claimed in claim 2, wherein said inside surface formed as the enveloping surface of a truncated cone is at an angle of inclination of between 10° and 30° to a plane perpendicular to the axis of said hub and flank.

4. The apparatus as claimed in claim wherein said inside surface of at least one of said annular walls is curved in rotational symmetry.

* * * * *